United States Patent [19]

Yan et al.

[11] 4,278,469

[45] Jul. 14, 1981

[54] PROCESS FOR REPAIRING ASPHALT PAVEMENT

[75] Inventors: Tsoung Y. Yan, Philadelphia, Pa.; Costandi A. Audeh, Princeton, N.J.

[73] Assignee: Mobil Oil Corporation, New York, N.Y.

[21] Appl. No.: 45,480

[22] Filed: Jun. 4, 1979

[51] Int. Cl.$^3$ ............................................. C08L 95/00
[52] U.S. Cl. ............................ 106/278; 260/28.5 AS
[58] Field of Search ................. 106/278; 260/28.5 AS

[56] References Cited

U.S. PATENT DOCUMENTS

| | | | |
|---|---|---|---|
| 2,871,212 | 1/1959 | Thayer | 260/28.5 AS |
| 3,879,323 | 4/1975 | Van Der Loos | 260/33.6 AQ |
| 3,919,148 | 11/1975 | Winters et al. | 260/28.5 AS |
| 4,105,612 | 8/1978 | Cushman et al. | 260/28.5 AS |
| 4,139,397 | 2/1979 | Yan | 106/278 |
| 4,177,079 | 12/1979 | Espenscheid | 260/28.5 AS |

Primary Examiner—Lorenzo B. Hayes
Assistant Examiner—Amelia B. Yarbrough
Attorney, Agent, or Firm—C. A. Huggett; M. G. Gilman; C. J. Speciale

[57] ABSTRACT

This invention provides a process for repairing and surfacing broken asphalt pavements which involves applying to the distressed pavement a binder composition which has exceptional solvating power for asphaltic material, and which functions to solubilize and incorporate aged pavement asphalt into the binder composition as it penetrates and fills void spaces.

Illustrative of a preferred binder composition which is applied to the distressed pavement is a homogeneous blend of (1) a FCC main column bottoms residuum boiling above about 650° F., and (2) an asphalt-soluble elastomer which improves the elasticity and wear resistance of the binder composition.

4 Claims, No Drawings

PROCESS FOR REPAIRING ASPHALT PAVEMENT

BACKGROUND OF THE INVENTION

Asphalt road pavements are being subjected to increasingly severe load stress. The repeated deflection of the road pavement causes elastic-type failure and fatigue failure in the pavement, which manifests itself in the form of pavement surface cracking and fracturing patterns. Conventional repair methods involve asphalt overlays, or replacement of the pavement surface.

A variety of paving grade asphalt compositions have been developed for the purpose of providing improved physical and mechanical properties in pavements under heavy traffic loads. Illustrative of these developments are the asphalt compositions disclosed in U.S. Pat. Nos. 2,871,212; 3,338,849; 3,374,104; 3,821,144; 3,879,323; 4,105,612; and the like.

Also of increasing importance for reasons of economy and convenience are methods and materials for repairing and surfacing broken asphalt pavements. An important objective has been the development of materials for repair of asphalt pavements which exhibit increased flexibility and resistance to fatigue failure. Efforts to provide asphaltic binder materials with the desired elastomeric properties for asphalt pavement repair are typified by the technology of U.S. Pat. Nos. 2,310,972; 3,578,001; 2,700,655; 3,049,836; 3,253,521; 3,270,631; and 3,340,780.

U.S. Pat. No. 3,891,585 discloses an elastomeric pavement repair material which consists essentially of a jellied blend of a paving grade asphalt and a non-oil resistant asphalt-soluble rubber.

U.S. Pat. No. 3,919,148 discloses an elastomeric pavement repair material which is the reaction product of paving grade asphalt, asphalt-soluble rubber, and a low viscosity asphalt solvent.

U.S. Pat. No. 4,021,393 describes an elastomeric pavement repair material which is the reaction product of paving grade asphalt, non-oil resistant rubber, and petroleum maltenes.

There remains a need for an asphaltic cement material adapted for repair of asphalt pavements which is economical and conveniently workable under road repair conditions, and which exhibits an improved combination of elasticity and wear resistance properties.

Accordingly, it is a main object of this invention to provide an improved asphaltic binder composition adapted for the repairing and surfacing of distressed asphalt pavement surfaces.

It is another object of this invention to provide a novel asphaltic composition which is composed of low value petroleum refinery residuum and scrap polymeric material.

It is a further object of this invention to provide a process for repairing and surfacing broken pavements, in which process the aged asphalt of the pavement surface becomes dissolved and incorporated into a liquid binder composition which is applied to the pavement surface as a repair vehicle.

Other objects and advantages of the present invention shall become apparent from the accompanying description and disclosure.

DESCRIPTION OF THE INVENTION

One or more objects of the present invention are accomplished by the provision of a process for repairing and surfacing broken asphalt pavements which comprises applying a fluid asphaltic binder composition to a distressed pavement surface in a sufficient quantity to penetrate and fill void spaces, wherein said asphaltic binder composition comprises a homogeneous blend of (1) a highly aromatic solvent component having a boiling range above about 650° F. and having a hydrogen content distribution in which the $H_{Ar}$ proton content is between about 30 and 50 percent, the $H_\alpha$ proton content is at least 30 percent and the $H_\alpha/H_\beta$ proton ratio is above about 1.4; and (2) between about 1-20 weight percent of a polymeric component which is substantially solvated by the solvent component and which imparts improved elasticity and wear resistance to the binder composition.

The asphaltic binder composition which is employed in the process is applied to the surface of distressed asphalt pavement in a sufficiently liquid form to penetrate and fill the interstices of the broken pavement. Usually this is facilitated by heating the binder composition to a temperature close to or above its softening point.

After the binder composition has been applied and has cooled to a firm set, the resultant repaired pavement exhibits excellent resistance to fatigue failure. The binder composition retains good elasticity, cohesion and adhesiveness properties under heavy stress conditions, even when applied to orthotropic surfaces such as bridge pavements.

As described more fully hereinafter, a unique aspect of the present invention process and asphaltic binder composition is the exceptional solvating power of the highly aromatic hydrocarbon solvent compound of the binder composition for asphalt and polymeric materials. When the binder composition is applied to a pavement surface in liquid form, the highly aromatic hydrocarbon solvent extracts the aged paving grade asphalt of the roadway into solution. The resultant plastic asphaltic medium sets into a relatively unitary structural mass. The cracks and voids in the pavement are effectively "healed" rather than simply filled.

HIGHLY AROMATIC HYDROCARBON SOLVENT COMPONENT

The hydrocarbon solvents preferred for the preparation of the present invention asphaltic binder composition are thermally stable, highly polycyclic aromatic mixtures having a boiling range above 650° F. which result from one or more petroleum refining operations. Representative highly aromatic hydrocarbon solvents include FCC main column bottoms; TCC syntower bottoms; alkane-deasphalted tar; coker gas oil; heavy cycle oil; FCC main column clarified slurry oil; mixtures thereof, and the like.

A highly aromatic hydrocarbon solvent such as a fluidized catalytic cracking (FCC) "main column" bottoms or a thermofor catalytic cracking (TCC) "syntower" bottoms contains a substantial proportion of polycyclic aromatic hydrocarbon constituents such as naphthalene, dimethylnaphthalene, anthracene, phenanthrene, fluorene, chrysene, pyrene, perylene, diphenyl, benzothiophene, and the like. Such refractory petroleum media are resistant to conversion to lower molecular products by conventional non-hydrogenative procedures. Typically, these petroleum refinery residua and recycle fractions are hydrocarbonaceous mixtures having an average carbon to hydrogen ratio above about 1:1, and a boiling point above about 450° F. For the purposes of the present invention, the hydrocarbon constituents of a petroleum refinery residua or recycle fraction or the like which boil below about 650° F. are removed by distillation to provide a highly aromatic hydrocarbon mixture which contributes the desired combination of viscosity properties and solvation power to the invention asphaltic binder composition.

"FCC main column bottoms" and "TCC syntower bottoms" are obtained as petroleum refinery residual streams from gas oil catalytic cracking operations.

In a FCC operation, preheated gas oil is charged to a reactor inlet line, where it picks up finely divided (e.g., 100 mesh) regenerated catalyst from the regenerator-catalyst standpipe and carries it into the reactor. Sensible heat of the gas oil charge plus sensible heat of hot catalyst from regeneration at temperatures upwards of 1200° F. supply sufficient heat to sustain the endothermic cracking reaction at a desired temperature. The upward flow of hydrocarbons in the FCC reactor is adjusted to maintain a fluidized bed of the finely divided catalyst, thereby promoting contact between catalyst and charge. In a typical operation, California heavy gas oil (650° F.–1000° F.) is converted over a zeolite catalyst (e.g., as described in U.S. Pat. No. 3,140,249) in an FCC operation at 950°–975° F., a weight hourly space velocity of 11 and a catalyst to oil ratio of 8. Reaction products are then passed into a distillation column, in the bottoms section of which they are quenched to about 600° F. to condense the heaviest hydrocarbons. Quenching is accomplished by circulating heavy condensate through a cooler and then back through the bottoms section of the column. The circulating condensate scrubs catalyst fines out of the up-flowing reaction products. The catalyst slurry so produced is sent to a settler to concentrate the catalyst, and the concentrated catalyst is separated and returned to the reactor. The oil separated from the concentrated bottoms is referred to as "FCC main column bottoms" or "FCC bottoms" or "clarified slurry oil", and is suitable for further processing in accordance with the practice of the present invention.

In a TCC operation, catalyst pellets of one-sixteenth inch diameter move downwardly through a reactor as a compact bed. In most modern TCC units, flow of gas oil charge is concurrent with catalyst flow in the reactor. As in FCC, heat of endothermic reaction is supplied by sensible heat of gas oil charge and catalyst. After charging wide cut gas oil (400°–1000° F.) from mixed Canadian crudes and employing a catalyst (e.g., as described in U.S. Pat. No. 3,140,249) at 875°–925° F. and a liquid hourly space velocity of 2 and a catalyst-to-oil ratio of 5, the reactor effluent is fractionated to provide a TCC bottoms fraction (i.e., "syntower bottoms") having a boiling range above 650° F., which is suitable for use as the highly aromatic hydrocarbon solvent component of the present invention asphaltic binder composition.

The nominal properties of various highly aromatic refining petroleum streams prior to the removal of hydrocarbon substituents boiling below about 650° F. are as follows:

| Syntower Bottoms | |
|---|---|
| Sulfur | 1.13% |
| Nitrogen | 450 ppm |
| Pour Point | 50° F. |
| 5% Boiling Point | 640° F. |
| 95% Point | 905° F. |
| Conradson Carbon | 9.96 |
| FCC Clarified Slurry Oil | |
| Sulfur | 1.04% |
| Nitrogen | 440 ppm |
| Pour Point | 50° F. |
| 5% Boiling Point | 630° F. |
| 95% Point | 924° F. |
| Conradson Carbon | 10.15 |
| Heavy Cycle Oil | |
| Sulfur | 1.12% |
| Nitrogen | 420 ppm |
| Initial Boiling Point | 373° F. |
| 95% Point | 752° F. |
| Conradson Carbon | 10.15 |

A typical FCC main column bottoms stream (or FCC clarified slurry oil) contains a mixture of chemical constituents as represented in the following mass spectrometric analysis:

| Compounds | Aromatics | Naphthenic/ Aromatics |
|---|---|---|
| Alkyl Benzenes | 0.4 | |
| Naphthene Benzenes | | 1.0 |
| Dinaphthene Benzenes | | 3.7 |
| Naphthalenes | 0.1 | |
| Acenaphthenes,(biphenyls) | | 7.4 |
| Fluorenes | | 10.1 |
| Phenanthrenes | 13.1 | |
| Naphthene phenanthrenes | | 11.0 |
| Pyrenes,fluoranthenes | 20.5 | |
| Chrysenes | 10.4 | |
| Benzofluoranthenes | 6.9 | |
| Perylenes | 5.2 | |
| Benzothiophenes | 2.4 | |
| Dibenzothiophenes | 5.4 | |
| Naphthobenzothiopenes | | 2.4 |
| Total | 64.4 | 35.6 |

Prior to removal of the light ends boiling below about 650° F., a typical FCC main column bottoms stream has the following nominal analysis and properties:

| Elemental Analysis, Wt. %: | |
|---|---|
| C | 89.93 |
| H | 7.35 |
| O | 0.99 |
| N | 0.44 |
| S | 1.09 |
| Total | 99.80 |

Pour Point, °F.: 50
CCR, %: 9.96

| Distillation: | | |
|---|---|---|
| IBP, | °F.: | 490 |
| 5%, | °F.: | 640 |
| 95%, | °F.: | 905 |

FCC main column bottoms are obtained (as noted above) by the catalytic cracking of gas oil in the presence of a solid porous catalyst. A more complete description of the production of this petroleum fraction is disclosed in U.S. Pat. No. 3,725,240.

The ability of a highly aromatic hydrocarbon solvent to solvate asphaltic and polymeric materials can be expressed in terms of specific types of hydrogen content as determined by proton nuclear magnetic resonance spectral analysis. Nuclear magnetic resonance characterization of heavy hydrocarbon oils is well developed. The spectra (60 μc/sec) are divided into four bonds ($H_\alpha$, $H_\beta$, $H_\gamma$ and $H_{Ar}$) according to the following frequencies in Hertz (Hz) and chemical shift ($\delta$):

|    | $H_\alpha$ | $H_\beta$ | $H_\gamma$ | $H_{Ar}$ |
|----|------|-------|---------|---------|
| Hz | 0–60 | 60–100 | 120–200 | 360–560 |
| $\delta$ | 0–1.0 | 1.0–1.8 | 2.0–3.3 | 6.0–9.2 |

The $H_{Ar}$ protons are attached to aromatic rings and are a measure of aromaticity of a solvent. $H_\alpha$ protons are attached to non-aromatic carbon atoms attached directly to an aromatic ring structure, e.g., alkyl groups and naphthenic ring structures. $H_\beta$ protons are attached to carbon atoms which are in a second position away from an aromatic ring, and $H_\gamma$ protons are attached to carbon atoms which are in a third position or more away from an aromatic ring structure.

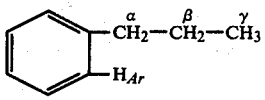

The $H_{Ar}$ protons are important because of their strong solvency power. A high content of $H_\alpha$ protons is particularly significant in a present invention hydrocarbon solvent, because $H_\alpha$ protons are labile and are potential hydrogen donors in a solvation process. $H_\alpha$ and $H_\gamma$ protons are paraffinic in nature and do not significantly contribute to the ability of a hydrocarbon solvent to solvate asphaltic and polymeric materials.

It is particularly preferred that the highly aromatic hydrocarbon solvent component of the present invention asphaltic composition has a hydrogen content distribution in which the $H_{Ar}$ proton content is between about 30 and 50 percent, the $H_\alpha$ proton content is at least about 30 percent and the $H_\alpha/H_\beta$ proton ratio is above about 1.4. Concomitantly it is desirable that the $H_\beta$ proton content is below 20 percent and the $H_\gamma$ proton content is below 13 percent. It is preferred that the highly aromatic hydrocarbon solvent component of the asphaltic composition is a highly aromatic petroleum refinery residuum solvent having the above defined hydrogen content distribution, and it is especially preferred that the highly aromatic petroleum refinery residuum solvent is selected from FCC main column bottoms and TCC syntower bottoms.

The proton distribution in examples of various highly aromatic hydrocarbon by-product streams are illustrated below.

| Example | $H_\alpha$ | $H_\beta$ | $H_\gamma$ | $H_{Ar}$ | $H_\alpha/H_\beta$ |
|---------|------|------|------|------|---------|
| FCC/MCB |      |      |      |      |         |
| #1      | 36.0 | 19.3 | 12.7 | 32.0 | 1.87    |
| #2      | 36.4 | 13.6 | 5.2  | 44.8 | 2.68    |
| #3      | 18.5 | 50.0 | 14.3 | 17.1 | 0.37    |
| #4      | 18.1 | 48.8 | 18.9 | 14.2 | 0.37    |
| TCC/Syntower Bottoms | | | | | |
| #1      | 29.8 | 20.9 | 7.9  | 41.4 | 1.42    |
| #2      | 16.3 | 48.1 | 20.0 | 15.6 | 0.35    |
| Clarified Slurry Oil | | | | | |
|         | 19.4 | 48.5 | 16.5 | 15.5 | 0.40    |
| Agha Jari Resid |  |  |  |  |       |
| (850 + °F.) | 12.0 | 60.0 | 24.0 | 5.0 | 0.20 |
| SRC Recycle Oil |  |  |  |  |       |
|         | 27.1 | 14.7 | 6.9  | 46.3 | 1.84    |
| Coal Tar | 5.  | —   | —    | 91.  | —       |

From the foregoing it is noted that hydrocarbons having the same general process derivation may or may not have the desired proton distribution previously described hereinabove. For example, FCC/MCB #1 and #2 have the desired proton distribution while FCC/MCB #3 and #4 do not.

Furthermore, it is not necessary that the highly aromatic hydrocarbon solvent component of the novel asphalt composition of this invention be derived only from petroleum. In the above table, it may be noted that SRC recycle solvent closely resembles FCC/MCB #1 and #2, particularly in the $H_\alpha/H_\beta$ ratio. The following table, from an article entitled "Recycle Solvent Techniques for the SRC Process", by R. P. Arderson, appearing in *Coal Processing Technology*, Volume 2, Am. Inst. of Chem. Engr., pages 130–32 (1975), demonstrates that some SRC recycle solvents can qualify for use as the highly aromatic hydrocarbon solvent component of the present invention asphaltic composition. Shown in the table are the hydrogen distribution changes which occur during multiple passes of recycle solvent through the coal extraction step of an SRC process. The initial solvent employed was Gulf Carbon Black Feedstock FS 120. For comparison purposes, the hydrogen distribution of various anthracene oils is illustrated.

|  | $H_\alpha$ | $H_\beta$ | $H_\gamma$ | $H_{Ar}$ | $H_\alpha/H_\beta$ |
|--|------|------|------|------|---------|
| Gulf FS 120 | 29.7 | 31.4 | 9.2 | 29.7 | 0.94 |
| Pass 1 | 30.8 | 30.2 | 8.2 | 30.8 | 1.02 |
| 2 | 31.3 | 28.4 | 7.1 | 33.2 | 1.10 |
| 3 | 29.9 | 26.7 | 7.4 | 36.0 | 1.12 |
| 4 | 30.3 | 24.7 | 6.9 | 38.1 | 1.23 |
| 5 | 30.1 | 23.9 | 6.2 | 39.8 | 1.26 |
| 6 | 28.8 | 22.3 | 7.0 | 41.9 | 1.29 |
| 7 | 28.7 | 21.2 | 6.3 | 43.8 | 1.35 |
| 8 | 29.4 | 20.1 | 5.8 | 44.7 | 1.46 |
| 9 | 29.7 | 19.3 | 4.9 | 46.1 | 1.54 |
| 10 | 30.0 | 18.8 | 4.7 | 46.5 | 1.60 |
| 11 | 29.8 | 18.8 | 4.9 | 46.5 | 1.58 |
| Raw Anthracene Oil | 18.9 | 3.4 | 0.6 | 77.1 | 5.6 |
| Partially Hydrogenated Anthracene Oil | 20.5 | 8.6 | 1.6 | 69.3 | 2.4 |
| Anthracene Oil Recycle | 23.3 | 15.2 | 4.7 | 56.7 | 1.53 |

Although not preferred, recycle solvents such as shown from passes 9–11 of the foregoing table may be employed as the highly aromatic hydrocarbon solvent component of the present invention asphaltic composition.

Polymeric Component

A polymeric component is included in the asphaltic binder composition for the purpose of imparting improved ductility and resistance to fatigue failure properties to the binder composition. The polymeric component is incorporated in the binder composition in a quantity between about 1–20 weight percent, based on the combined weight of asphalt and polymeric components, and preferably in a quantity between about 5–20 weight percent.

For optimal effect, it is essential that the polymeric component is substantially non-oil resistant and asphalt-soluble in its solubility properties. The polymeric component on the average will have a molecular weight in the range between about 5,000 and 10,000,000. An ethylene-vinyl acetate copolymer having a melt index between about 20–50, for example, has excellent physical and mechanical qualifications for use as the polymeric composition of the invention binder composition.

By the term "asphalt-soluble" is meant a polymeric component which dissolves or is solvated in an amount up to about 80 weight percent when mixed and heated with an equal weight of the highly aromatic hydrocarbon solvent. Any high molecular weight fraction of the polymeric component which does not dissolve or solvate, can function advantageously as a compatible suspension phase.

Illustrative of the types of resin materials which can be employed as the polymeric component are poly(-halogenated hydrocarbons), polyolefins and polyvinyl aryls such as polyvinyl chloride, polyethylene and polystyrene. Particularly desirable polymeric derivatives are natural and synthetic rubbers such as plantation rubber, thiokols, neoprenes, nitrile rubbers, styrene rubbers, polybutadiene, acrylate rubbers, polyurethanes, and mixtures thereof which are substantially non-oil resistant and asphalt-soluble.

While it is possible to employ new and unused resin materials as the polymeric component in the present invention asphaltic binder composition, it is particularly advantageous to employ "scrap" or "reclaimed" rubber for economic reasons and for purposes of environmental protection. As employed herein, the term "scrap" rubber is meant to include "reclaimed" rubber.

The scrap rubber can be in the form of (1) ground whole tire rubber (with or without carcass fibers); (2) unprocessed rubber buffings, i.e., a byproduct of tire retreading; (3) ground inner tubes; (4) reclaimed rubber; (5) partially devulcanized reclaimed rubber; and the like.

The reclaimed rubber can be devulcanized or partially devulcanized and can be prepared by the digester process, Heater or Pan process, Lancaster-Banbury process, and other conventional reclaiming processes as more fully described in U.S. Pat. No. 3,891,585.

Whole tire rubber can be ground, screened, and treated to remove metal, cord and fabric therefrom prior to usage in the invention asphaltic binder composition. However, whole used tire carcasses can be comminuted and employed directly without any prior treatment.

The comminuted scrap rubber component can be introduced into the asphaltic binder composition in the form of a fine powder having a particle size in the range between about −4 mesh and 200 mesh. A process for production of finely powdered scrap rubber is disclosed in U.S. Pat. No. 2,853,742. It is also convenient and practical to employ the scrap rubber in the form of shredded or diced material. The particle size of the shaped rubber cubes or pellets can range from about 0.05 inch to about 0.5 inch in dimensions.

Properties Of The Asphaltic Binder Composition

The invention asphaltic binder composition is conveniently prepared by admixing and heating together the highly aromatic hydrocarbon solvent and non-oil resistant polymeric components of the composition. If desired, the heating cycle can be postponed until the time the asphaltic binder composition is to be applied to a pavement surface. It is preferred that the heating cycle is of sufficient intensity and duration to completely solubilize and homogenize the admixture of components.

Illustrative of the nominal properties of a present invention asphaltic binder composition is a ring and ball softening point (ASTM D-36) between about 100°–150° F., and a viscosity (ASTM D-2170) between about 80–300 centistokes at 275° F.

In a further embodiment, the present invention contemplates the provision of a ductile asphaltic composition adapted for repairing and surfacing distressed asphalt pavements which comprises a blend of (1) between about 30–80 weight percent of an asphalt component selected from paving grade and marginal asphalt materials; (2) between about 10–60 weight percent of an aromatic solvent component having a boiling range above about 650° F. and having a hydrogen content distribution in which the $H_{Ar}$ proton content is between about 30 and 50 percent, the $H_\alpha$ proton content is at least 30 percent and the $H_\alpha/H_\beta$ proton ratio is above about 1.4; and (3) between about 1–20 weight percent of a polymeric component which is substantially asphalt-soluble; wherein the said asphaltic composition has a ring and ball softening point in the range between about 110°–185° F., a ductility of more than 100 centimeters at 77° F., and a penetration value in the range between about 70–300.

The ductility of the above-defined asphaltic composition is measured in accordance with ASTM method D 133-44. The penetration values at 77° F. is measured by the standard method of test for penetration of bituminous materials (ASTM D 5-52), the penetration values being measured as the tenths of a millimeter that a tapered standard needle (0.14 to 0.16 mm tip diameter) will penetrate the asphalt in five seconds with a 100 gram load.

As defined above, the asphaltic composition contains an asphalt component selected from paving grade and marginal asphaltic materials. A typical paving grade asphalt exhibits a viscosity-penetration index higher than about $2.5 \times 10^5$.

By the term "viscosity penetration index" is meant the product of viscosity of asphalt in stokes at 140° F. time penetration at 77° F./100 g/5 sec. Asphalt stocks which exhibit greater increase in viscosity-penetration index in an air-blowing process are superior stocks, because a higher viscosity-penetration index value indicates disproportionally greater increase in viscosity (or softening point) than the decrease in penetration.

The quality of an asphalt stock for air-blowing can be evaluated by (1) a comparison of viscosity-penetration index at the same penetration; or by (2) a comparison of the response of the asphalt stock to air-blowing, i.e., the slope of viscosity-penetration index versus penetration $\alpha$, in the equation log (viscosity-penetration) equals $\alpha(\text{penetration}) + \beta$, or change of viscosity penetration index for each penetration number at 45 penetration, $\gamma$.

It is a particular advantage of the present invention that a marginal asphalt can be employed as the asphalt component in the above-defined composition instead of a paving grade asphalt. By the term "marginal" asphalt is meant any of the various types of petroleum refinery asphalts and natural asphalts which after air-blowing have a viscosity-penetration index lower than about $2.5 \times 10^5$. Marginal asphalts are generally unsuitable as stocks for paving grade binders. Illustrative of typical sources of marginal asphalt stocks are:

A. Petroleum asphalts
1. Straight-reduced asphalts
   a. Atmospheric or vacuum distillation
   b. Solvent precipitation
2. Thermal asphalts, as residues from refinery cracking operations B. Native or natural asphalts
1. Mineral content below 5 percent
   a. Asphaltites such as gilsonite, grahamite, and glance pitch
   b. Burmudez and other natural deposits
2. Mineral content over 5 percent
   a. Rock asphalts
   b. Trinidad and other natural deposits There are two kinds of asphalt stocks which are well-known to have poor qualities for air-blowing treatment:

(1) Residuum of high hydrogen content, i.e., a low carbon-hydrogen ratio. This type of stock contains higher paraffinic compounds which are difficult to convert to resins and asphaltenes via air-blowing.

(2) Short residuum. When more and more valuable distillates are driven off from petroleum crudes, the penetration of residua becomes lower, and eventually straight-run asphalt results. If additional distillates are removed, the resulting short residuum cannot be blown to high viscosity without exceeding the lower limit of penetration.

Further, because of the exceptional solvating power of the highly aromatic hydrocarbon solvent component in the above-defined asphaltic composition, the asphalt component can be introduced in the form of reclaimed aged pavement asphalt. Aggregate can be included if the asphaltic composition is to be employed to repair pavements which contains large fractures and voids, or if a pavement is to be resurfaced.

The following examples are further illustrative of the present invention. The reactants and other specific ingredients are presented as being typical, and various modifications can be derived in view of the foregoing disclosure within the scope of the invention.

EXAMPLE I

An FCC main column bottoms is topped to yield a residual fraction having a 650° F. cut point. The residual fraction has a hydrogen content distribution in which the $H_{Ar}$ content is 35 percent, the $H_\alpha$ content is 37 percent and the $H_\beta$ content is 18 percent.

A batch of the 650° F. FCC/MCB residual fraction is heated to about 400° F., and to the heated mass there is added ethylene-vinyl acetate (33 weight percent vinyl acetate) having a melt index of 43 in sufficient quantity to constitute about 20 weight percent of the total asphaltic admixture. While maintained at a temperature of about 375° F., the asphaltic admixture is spread over a fatigued asphalt pavement which exhibits a pattern of cracks and fractures. While the spread asphaltic admixture is still plastic, a layer of fine aggregate is applied over the coated pavement surface. No fatigue cracking is evident when the repaired surface is resubjected to its normal traffic stress.

EXAMPLE II

A marginal asphalt residuum of high paraffinic content (viscosity-penetration index lower than $2.5 \times 10^5$) is heated to 400° F. To the heated batch is added ground tire rubber (SBR, $-25$ to $+50$ mesh) and a TCC syntower bottoms equivalent in hydrogen content distribution to the FCC main column bottoms described in Example I, and the heating is continued for one hour. The proportions of components are in a weight ratio of 40/50/10 of asphalt to TCC syntower bottoms to scrap rubber.

The asphaltic admixture exhibits asphaltic properties at ambient temperatures. The composition is substantially homogeneous and has a ring and ball softening point of 130° F., a ductility of about 110 at 77° F. and a penetration value of about 150.

What is claimed is:

1. A ductile asphaltic composition adapted for repairing and surfacing distressed asphalt pavements which comprises a blend of (1) between about 30–80 weight percent of an asphalt component selected from marginal asphalt materials having a viscosity-penetration index lower than about $2.5 \times 10^5$; (2) between about 10–60 weight percent of a highly aromatic petroleum refinery residuum solvent component having a boiling range above about 650° F. and having a hydrogen content distribution in which the $H_{Ar}$ proton content is between about 30 and 50 percent, the $H_\alpha$ proton content is at least 30 percent and the $H_\alpha/H_\beta$ proton ratio is above about 1.4; and (3) between about 1–20 weight percent of a polymeric component which is substantially asphalt-soluble; wherein the said asphaltic composition has a ring and ball softening point in the range between about 110°–185° F., a ductility of more than 100 centimeters at 77° F., and a penetration value in the range between about 70–300.

2. A ductile asphaltic composition in accordance with claim 1 wherein the highly aromatic petroleum refinery residuum solvent component is selected from FCC main column bottoms and TCC syntower bottoms.

3. A ductile asphaltic composition in accordance with claim 1 wherein the polymeric component is comminuted scrap rubber.

4. A ductile asphaltic composition in accordance with claim 1 wherein the polymeric component is a copolymer of ethylene and vinyl acetate having a melt index between about 20–50.

* * * * *

UNITED STATES PATENT AND TRADEMARK OFFICE
CERTIFICATE OF CORRECTION

PATENT NO. : 4,278,469
DATED : July 14, 1981
INVENTOR(S) : TSOUNG Y. YAN and COSTANDI A. AUDEH It is certified that error appears in the above-identified patent and that said Letters Patent are hereby corrected as shown below:

Column 5, line 28, "H$\alpha$" should read -- H$\beta$ --.

Column 8, line 25, "133-44" should read -- 113-44 --.

Column 8, line 37, "105" should read -- $10^5$ --.

Signed and Sealed this

Third Day of July 1984

[SEAL]

Attest:

GERALD J. MOSSINGHOFF

Attesting Officer       Commissioner of Patents and Trademarks